US012276124B2

(12) United States Patent
Ustach et al.

(10) Patent No.: US 12,276,124 B2
(45) Date of Patent: Apr. 15, 2025

(54) BALLASTED SIGN

(71) Applicant: McCue Corporation, Danvers, MA (US)

(72) Inventors: Thomas Ustach, Boston, MA (US); Matthew O'Brien, Gresham, OR (US)

(73) Assignee: McCue Corporation, Danvers, MA (US)

( * ) Notice: Subject to any disclaimer, the term of this patent is extended or adjusted under 35 U.S.C. 154(b) by 124 days.

(21) Appl. No.: 18/114,303

(22) Filed: Feb. 27, 2023

(65) Prior Publication Data

US 2023/0272638 A1 Aug. 31, 2023

Related U.S. Application Data

(60) Provisional application No. 63/314,773, filed on Feb. 28, 2022.

(51) Int. Cl.
*G09F 7/00* (2006.01)
*E04H 12/22* (2006.01)
*G09F 7/18* (2006.01)

(52) U.S. Cl.
CPC ........... *E04H 12/2246* (2013.01); *G09F 7/18* (2013.01); *G09F 2007/1817* (2013.01)

(58) Field of Classification Search
CPC ...... E01F 9/692; E01F 9/688; E04H 12/2261; E04H 12/2269; G09F 15/0037; G09F 2007/1804; G09F 2007/1856; Y10S 248/91
See application file for complete search history.

(56) References Cited

U.S. PATENT DOCUMENTS

| | | | | | |
|---|---|---|---|---|---|
| 4,019,271 | A * | 4/1977 | Latimer | E01F 9/688 | 116/63 P |
| 5,088,680 | A * | 2/1992 | Farmer | E01F 9/692 | 248/910 |
| 10,077,535 | B2 * | 9/2018 | McCue | E01F 9/681 | |
| 2003/0145498 | A1 * | 8/2003 | Venegas, Jr. | E04H 12/2246 | 40/607.1 |
| 2005/0023428 | A1 * | 2/2005 | Woude | E04H 12/2246 | 248/530 |
| 2007/0241255 | A1 * | 10/2007 | Dvoracek | G09F 15/0056 | 248/346.01 |
| 2010/0277290 | A1 * | 11/2010 | Knudsen | E04H 12/2269 | 264/32 |
| 2014/0182109 | A1 * | 7/2014 | Williams | E01F 9/692 | 29/428 |
| 2016/0312417 | A1 * | 10/2016 | McCue | E01F 9/629 | |
| 2023/0272638 | A1 * | 8/2023 | Ustach | E04H 12/2246 | 40/607.1 |

* cited by examiner

*Primary Examiner* — Shin H Kim

(74) *Attorney, Agent, or Firm* — Occhiuti & Rohlicek LLP

(57) ABSTRACT

An apparatus comprises a signpost assembly that includes a sign holder, a signpost that supports the sign holder, and a base for receiving the signpost. The base engages the signpost at two locations along the signpost, thereby ensuring that the signpost is held vertically.

19 Claims, 5 Drawing Sheets

BALLASTED SIGN

CROSS-REFERENCE TO RELATED APPLICATION

This application claims the benefit of U.S. Provisional Application No. 63/314,773 filed on Feb. 28, 2022. The entire contents of the application are incorporated herein by reference.

BACKGROUND

Signs are often used to communicate information to drivers in vehicles. For example, parking lots typically have signs designating parking spaces as being reserved for particular employees or for the handicapped. Such parking lot signs can also designate pick up areas or areas that are off limits for parking.

Such signs, however, require some support. A common means for supporting a sign is a signpost. The sign is typically fastened (e.g., bolts or screws) to an upper end of the signpost. The lower end of the signpost, however, is problematic. In many cases, the lower end of the signpost is simply anchored into the ground. Known anchoring methods include the use of concrete, bolts, screws, and adhesives, as well as drilling a core or potting.

The foregoing anchoring methods have two disadvantages. First, they are relatively permanent. One cannot just pick up a sign and move it. Second, when struck by a vehicle, it is possible to damage the surface into which the sign has been embedded.

An alternative to embedding the sign into the ground is to attach the lower end to a heavy base. When struck by a vehicle, such a sign may topple over. But it will not damage the pavement. Moreover, it can often easily be righted.

During installation of such a sign, one typically starts with an empty base and fills it with ballast. However, a problem remains as to how to securely attach the signpost to the base in a manner that is mechanically strong and simple to do.

SUMMARY

In one aspect, the invention features a signpost assembly having a sign holder, a signpost that supports the sign holder, and a base for receiving the signpost. The base engages the signpost at two locations along the signpost, thereby ensuring that the signpost is held vertically.

In other embodiments, the base includes a lid having a posthole that is configured to fit the signpost. In such embodiments, the lid is configured to slide along the signpost when the signpost passes through the posthole. The lid is sized and shaped to cover a filling aperture that is to be used for filling the base with ballast.

Among the embodiments are those in which the signpost includes an upper end that supports the sign holder, a lower end opposite the upper end, and a flange fixed to the lower end.

In still other embodiments, the base includes a filling aperture for receiving ballast and a posthole below the filling aperture through which ballast entering the filling aperture is able to exit the base.

Some embodiments include a base that has a bottom surface having a posthole formed therein. The posthole is one that has been sized and shaped to accommodate the signpost as the signpost enters the base through the bottom surface.

In still other embodiments, the base includes a bottom surface having a recess formed therein and a posthole in the recess, the posthole being sized and shaped to accommodate the signpost. In such embodiments, the recess prevents the signpost from passing all the way through the base.

Among the embodiments are those in which the signpost includes a flange fixed at an end thereof and the base includes a recess on a bottom surface thereof with a posthole in the recess. In these embodiments, the recess is sized and shaped to accommodate the flange and the posthole is sized and shape to accommodate the signpost.

Also among the embodiments are those in which the base includes a lid and a bottom face and the base engages the signpost at the lid and at the bottom face.

In still other embodiments, the signpost includes a flange fixed to a bottom end thereof and the base includes a filling aperture, a lid, a bottom face, a first posthole and a second posthole. The lid covers the filling aperture. The bottom face includes a recess formed therein. This recess is sized and shaped to receive the flange. The two postholes are aligned such that the signpost, after having passed through both postholes, stands vertically.

Embodiments further include those in which the base has a square footprint and those in which the base has a circular footprint.

In some embodiments, the body includes a sloping upper surface, a bottom surface having drainage channels, and beveled edges. Among these are those in which the slope matches the angle of repose of the ballast that is to be used.

Yet other embodiments include a ballast in the base. Examples of a ballast include pea stone, gravel, and sand.

Also, among the embodiments are those in which the base includes an aperture and a lid for closing the aperture. The lid includes a posthole and a collar surrounding the posthole to permit the lid to be fastened to the signpost above the aperture in the base.

In another aspect, the invention features a method that includes assembling a sign assembly including a base, a sign holder, and a signpost. Such assembly includes causing the base to engage a signpost at first and second locations along a vertical line and fixing the sign holder to an upper end of the signpost.

Among the practices are those in which causing the base to engage the signpost includes passing the signpost through a posthole in a bottom surface of the base and passing the signpost through a posthole in a lid of the base.

Also, among the practices are those in which causing the base to engage the signpost includes seating a flange disposed at an end of the signpost in a recess in a bottom surface of the base and passing the signpost through a posthole in a lid of the base.

Still other practices include bringing the sign assembly to a parking space in a parking lot prior to assembly thereof.

In still other practices, there is an additional step of filling the base with ballast after having engaged the signpost at the first location and before having engaged the signpost to the base at the second location.

In some practices, causing the base to engage a signpost at the first and second locations includes passing the signpost through a first posthole and passing the sign post through a second posthole. Such practices further include filling the base with ballast through a filling aperture in the base after having passed the signpost through the first posthole and before having passed it through the second posthole, placing a lid of the base onto the filling aperture, and adjusting the lid to cover the aperture.

DETAILED DESCRIPTION

Figure 1:
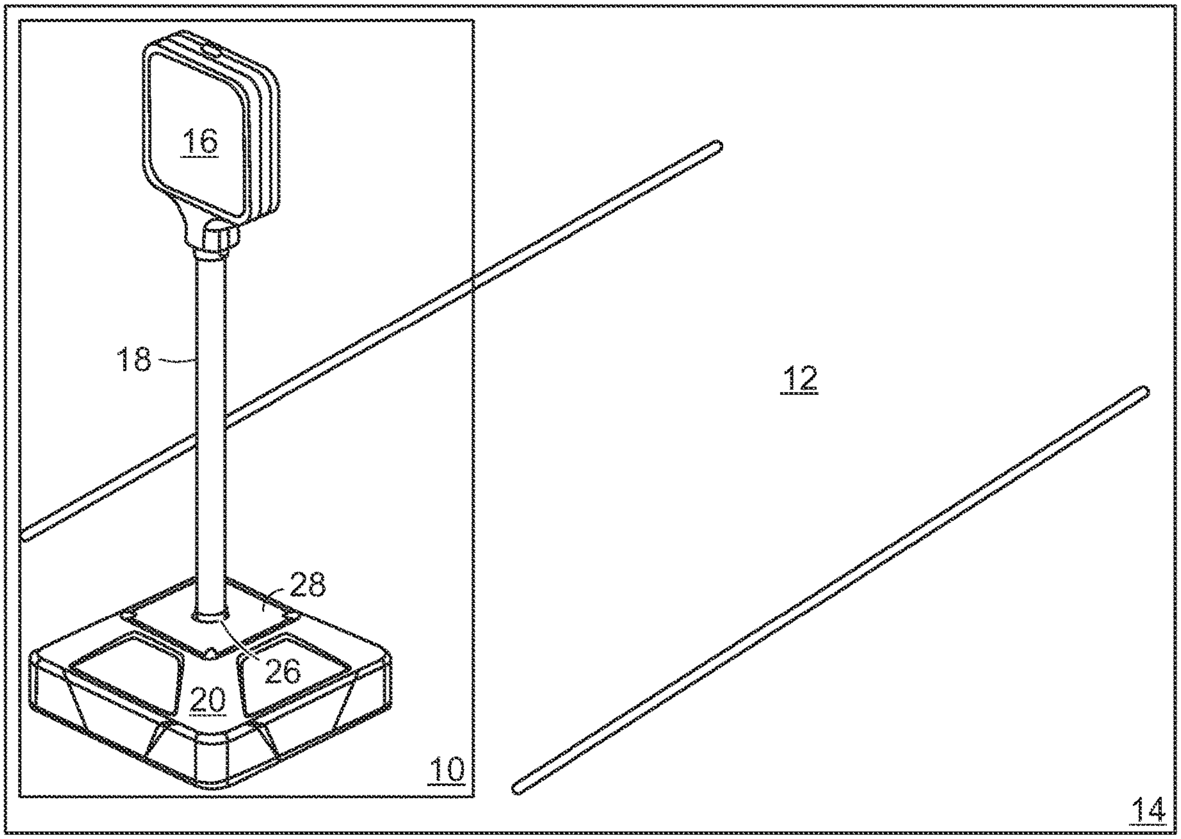
FIG. 1 is an isometric view of a sign assembly; an apparatus comprising a signpost assembly, said signpost assembly comprising a sign holder, a signpost that supports said sign holder, and a base for receiving said signpost, wherein said base engages said signpost at two locations along said signpost, thereby ensuring that said signpost is held vertically.

FIG. 1 shows a sign assembly 10 marking a parking space 12 in a parking lot 14. The sign assembly 10 comes in three pieces that are to be assembled together: a sign holder 16, a signpost 18, and a base 20. These are shown in detail in FIGS. 2-4.

Figure 2:
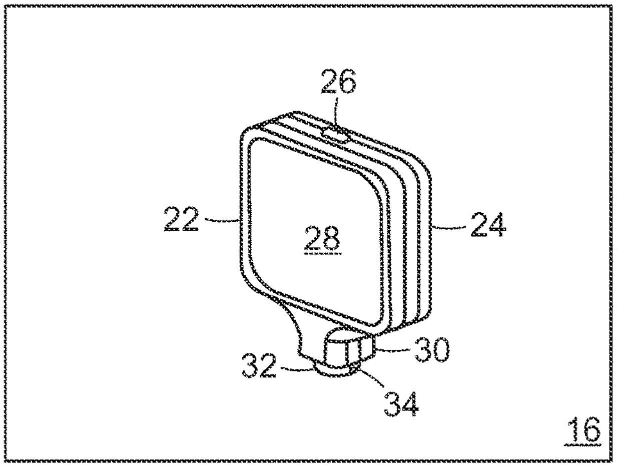
FIG. 2 shows details of the sign holder for the sign assembly of FIG. 1.

Referring now to FIG. 2, the sign holder 16 shown in FIG. 1 features a front face 22 and a rear face 24, each of which includes holes 26 that are centered at the top and bottom of the sign holder for attaching the content that the sign is to communicate via a placard 28.

A neck 30 extends from the bottom of the sign holder 16. The neck 30 includes a collar 32 with at least two holes for securing a fastener 34 between the collar 32 and the signpost 18.

Examples of sign holders 16 include those that accommodate two-sided signs and those that accommodate four-sided signs. In a preferred embodiment, the sign holder 16 is made of a lightweight plastic.

Figure 3:
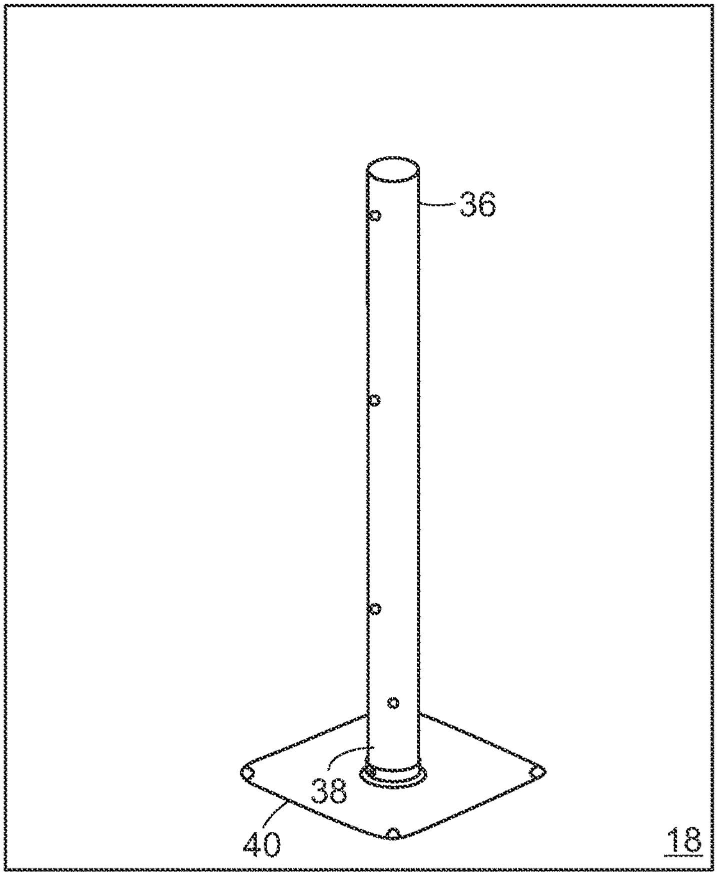
FIG. 3 shows details of the post for the sign assembly of FIG. 1.

As shown in FIG. 3, the signpost 18 of FIG. 1 extends between an upper end 36, which is received by the sign holder's neck 30, and a lower end 38 that is fixed to a flange 40, for example by being welded or fastened. In the illustrated embodiment, the flange 40 is square. However, other shapes, such as a circle or regular polygon, are also possible.

Figure 4:
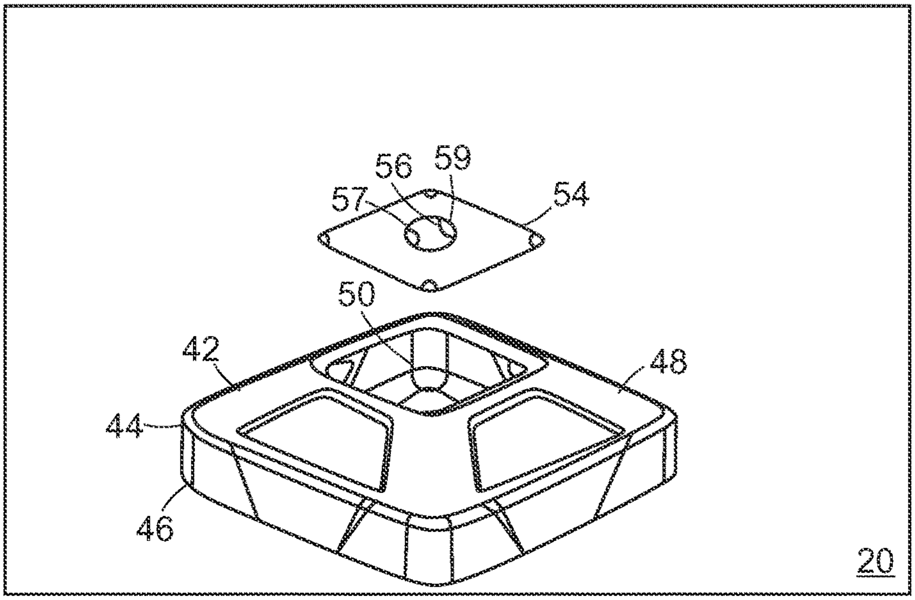
FIG. 4 shows details of the base for the sign assembly of FIG. 1.

Referring now to FIG. 4, the base 20 includes a hollow body 42 having a roughly square footprint. The body 42 has beveled upper edges 44 and beveled lower edges 46 to reduce stress at corners and a sloping top surface 48 to promote drainage. In alternative embodiments, the footprint is circular rather than square.

Figure 5:
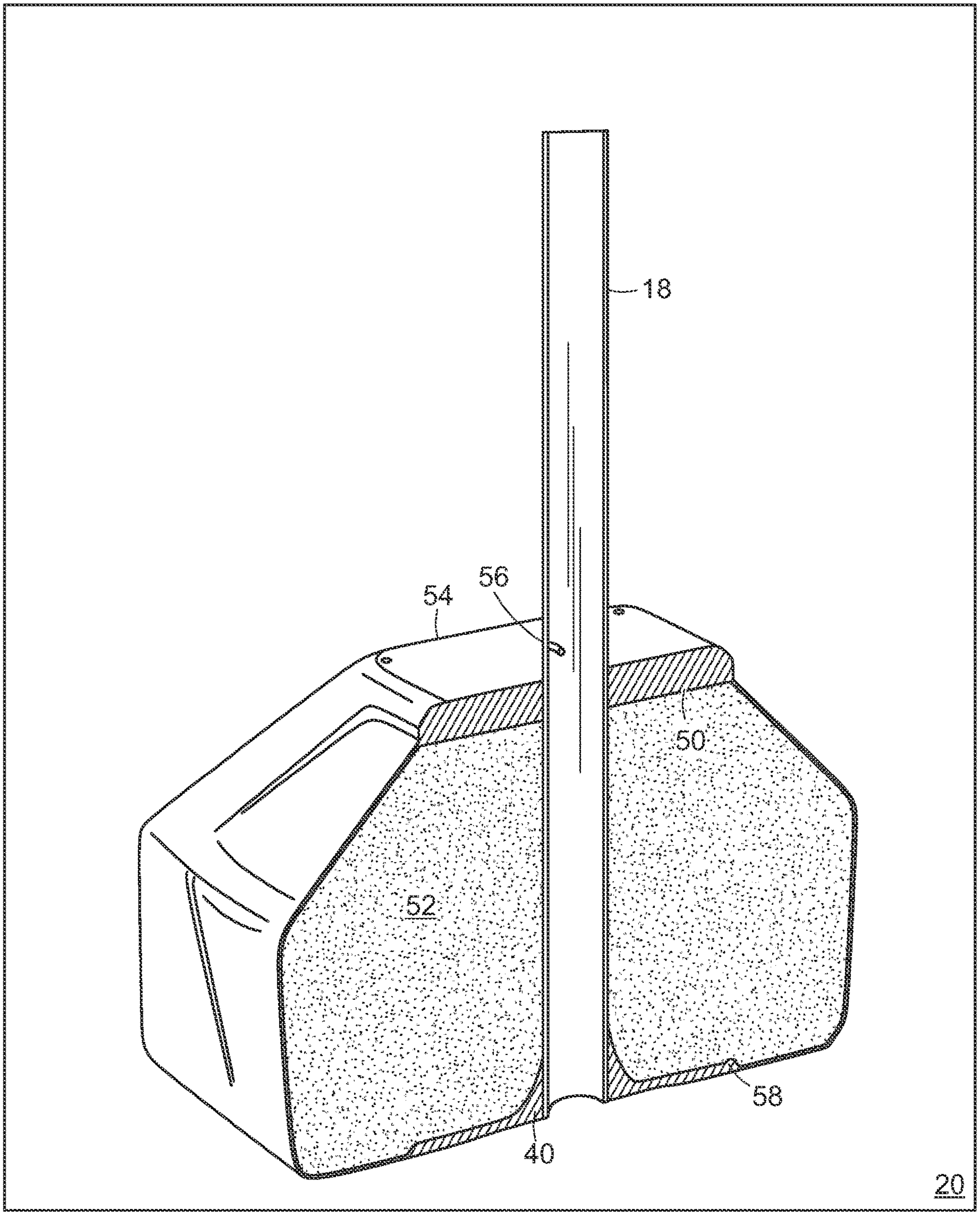
FIG. 5 shows a cross-section of the base shown in FIG. 4.

A filling aperture 50 in the body's top surface 48 permits the body 42 to be filled with ballast 52, as shown in FIG. 5. A typical ballast 52 is a granular material of high density. Examples include sand, gravel, and pea-stone or pea gravel. The ballast's weight stabilizes the sign assembly 10 without requiring permanent attachment to the surface of the parking lot 14. In a preferred embodiment, the angle of the sloping top surface 48 corresponds to the angle of repose for the ballast, thereby promoting the ability to fully pack the body 42 with ballast 52, as shown in FIG. 5.

In a preferred embodiment, the filling aperture 50 has an area that is larger than that which would be required to accommodate a hose of the type that would be used for cases in which water serves as ballast. Preferably, the area of the filling aperture 50 is as much as half of the area of the body's footprint.

A lid 54 sized and shaped to cover the filling aperture 50 includes a first post hole 56 that is sized and shaped to receive the signpost 18. Once the signpost 18 has passed through the first post hole 56, the lid 54 is free to slide along it. A collar 57 around the first post hole 56 includes openings 59 to admit fasteners that fasten the lid 54 to the signpost 18 when required. This can be useful, for example, to hold the lid 54 out of the way while the base 20 is being filled with ballast 52.

Figure 6:
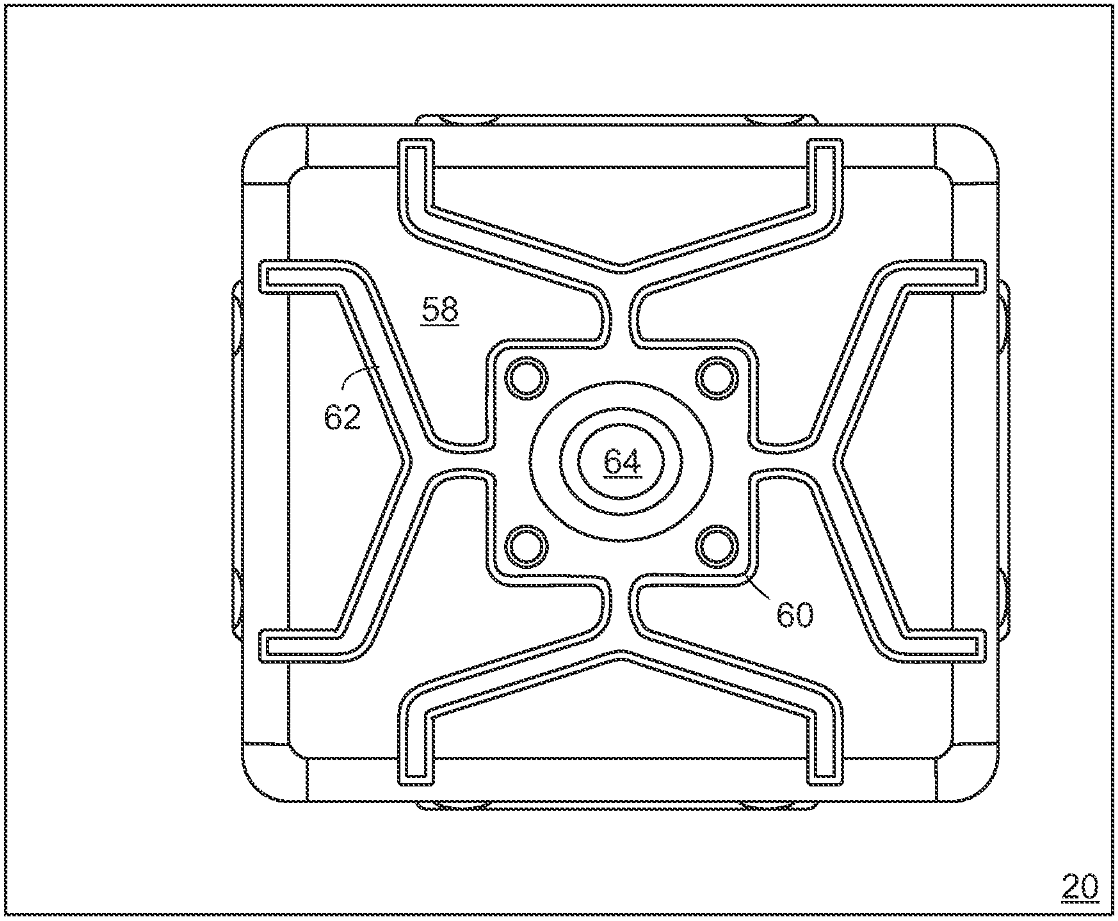
FIG. 6 shows a plan view of the bottom surface of the base shown in FIG. 5.

FIG. 5 shows a cross section of the base 20 with the body's interior having been filled with ballast 52. The base 20 has a bottom surface 58 having a recess 60 sized and shaped to accommodate the flange 40 that is fixed the distal end 38 of the signpost 18, as shown in FIG. 3. This recess 60 can be seen in FIG. 6, along with additional drainage channels 62 and a second post hole 64 that is sized and shaped to accommodate the pole 18. In a preferred embodiment, the recess 60 is sized and shaped so that the flange 40 can be nestled securely within it. Among these embodiments are those in which the recess 60 has an area that is less than or substantially the same as that of the filling aperture 50. For example, the geometrical area of lid 54 is within 90% to just less than 100% of the area of recess 60.

On that note, the lid 54 and filling aperture 50 are both sized to be substantially the same as recess 60.

Figure 7:
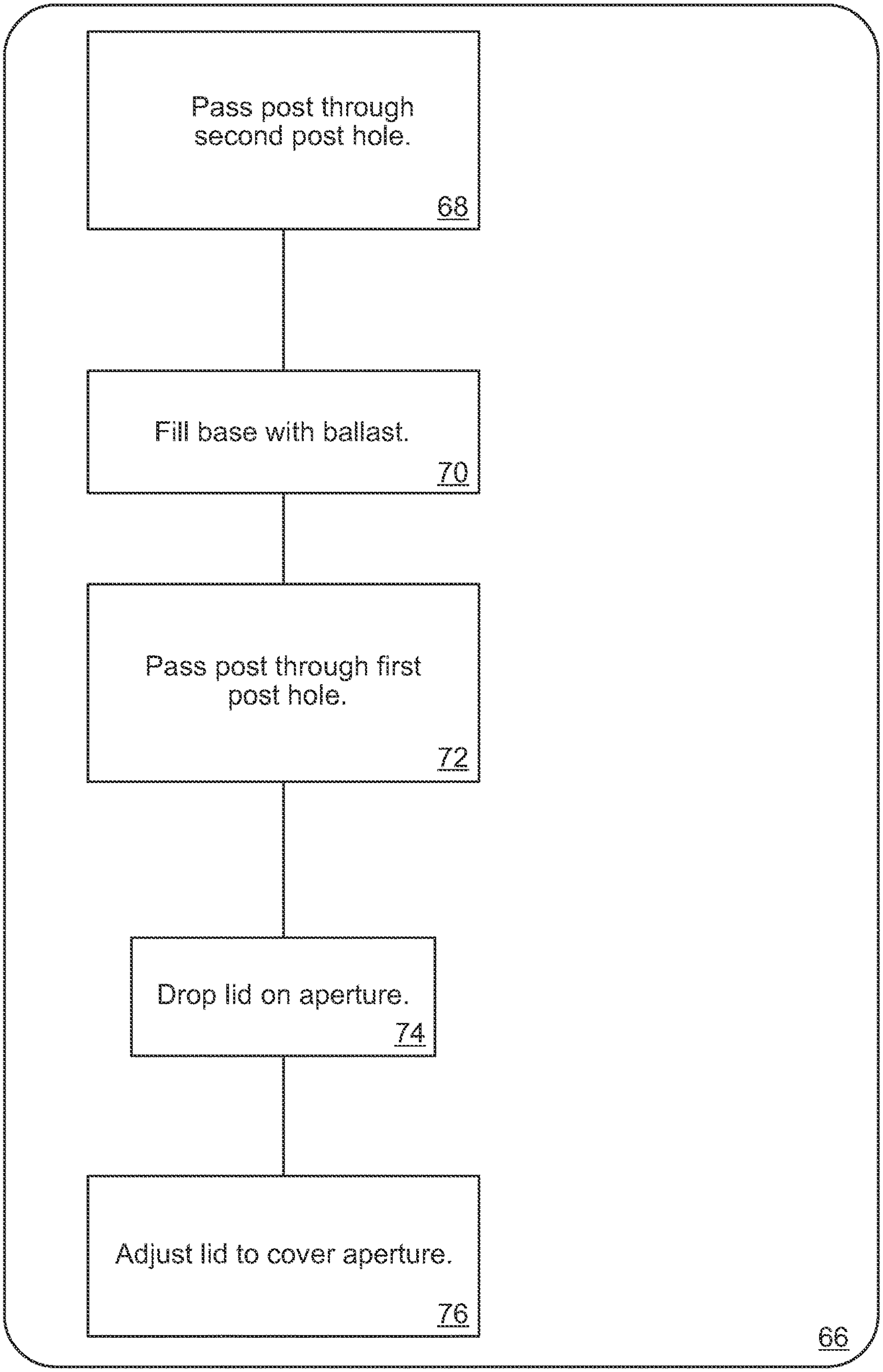
FIG. 7 is a flow chart of a procedure for assembling the sign assembly of FIG. 1.

Referring to FIG. 7, a process 66 for installing the sign assembly 10 includes passing the upper end of the pole 20 through the second post hole 64 until the flange 40 is nestled in the recess 60 (step 68). This is followed by filling the base 20 with ballast 52 while making sure that the signpost 18 is close to being vertical (step 70). The upper end 36 of the signpost 18 is then passed through the first post opening 56 in the lid 54 (step 72). The lid 54 is then allowed to drop down to the aperture 50 (step 74). With some slight adjustment, the lid 54 is aligned so that it covers the aperture 50 (step 76). The first and second post holes 56, 64 are, at this point, along a vertical line. As a result, the signpost 18 is itself forced to be along the same vertical line.

Having Described the Invention and a Preferred Embodiment there, What is Claimed as New and Secured by Letters Patent is:

What is claimed:

1. An apparatus comprising a signpost assembly, said signpost assembly comprising a sign holder, a signpost that supports said sign holder, and a base for receiving said signpost, wherein said base comprises an aperture for receiving ballast, a first posthole that is disposed in said aperture, said first posthole being sized and shaped to receive said signpost to permit said signpost to exit said base, and a bottom surface having a second posthole formed therein, said second posthole being sized and shaped to accommodate said signpost as said signpost enters said base through said bottom surface and being disposed such that ballast entering said aperture is able to exit said base through said second posthole.

2. The apparatus of claim 1, wherein said base comprises a lid configured to slide along said signpost through said first posthole, said lid being sized and shaped to prevent ballast from entering said base through said aperture.

3. The apparatus of claim 1, wherein said signpost comprises an upper end that supports said sign holder, a lower end opposite said upper end, and a flange fixed to said lower end to engage said bottom surface of said base.

4. The apparatus of claim 1, wherein said bottom surface comprises a recess formed therein, wherein said second posthole is surrounded by said recess, and wherein said recess prevents said signpost from passing all the way through said base.

5. The apparatus of claim 1, wherein said signpost comprises a flange fixed at an end thereof and wherein said bottom surface comprises a recess that surrounds said second posthole, said recess being sized and shaped to accommodate said flange, and wherein engagement of said flange in said recess prevents said signpost from passing all the way through said base.

6. The apparatus of claim 1, wherein said base comprises a lid and a bottom face and wherein said base engages said signpost at said lid and at said bottom face.

7. The apparatus of claim 1, wherein said signpost comprises a flange fixed to a bottom end thereof, wherein said base a lid sized and shaped to cover said aperture, wherein said first posthole and said second posthole are aligned such that said signpost, after having passed through said first and second postholes and with said flange having engaged said bottom surface, stands vertically.

8. The apparatus of claim 1, wherein said base comprises a sloping upper surface, a bottom surface having drainage channels, and beveled edges.

9. The apparatus of claim 1, further comprising pea stone in said base.

10. The apparatus of claim 1, wherein said base comprises a lid for closing said aperture, wherein said first posthole is a hole in said lid, and wherein said lid further comprises a collar surrounding said posthole to permit said lid to be fastened to said signpost so as to be suspended above said aperture.

11. The apparatus of claim 1, wherein said sign holder comprise a neck that extends from a bottom thereof, wherein said neck comprises a collar having holes for securing a fastener between said collar and said signpost.

12. The apparatus of claim 1, further comprising a flange attached to a lower end of said signpost and a recess in said bottom surface that is conformal with said flange, wherein said flange has an area equal to that of said aperture.

13. A method comprising assembling a sign assembly comprising:

a base, a sign holder, and a signpost wherein assembling said sign assembly comprises causing said base to engage a signpost at first and second locations along a vertical line, causing ballast to engage said signpost between said first and second locations, and fixing said sign holder to an upper end of said signpost, wherein causing said base to engage a signpost at said first and second locations comprises passing said signpost through a first posthole and passing said signpost through a second posthole, and wherein said method further comprises filling said base with ballast through a filling aperture in said base after having passed said signpost through said first posthole and before having passed it through said second posthole, placing a lid of said base onto said filling aperture, and adjusting said lid to cover said aperture.

14. The method of claim 13, wherein causing said base to engage said signpost comprises passing said signpost through a posthole in a bottom surface of said base and passing said signpost through a posthole in a lid of said base.

15. The method of claim 13, wherein causing said base to engage said signpost comprises seating a flange disposed at an end of said signpost in a recess in a bottom surface of said base and passing said signpost through a posthole in a lid of said base.

16. The method of claim 13, wherein further comprising bringing said sign assembly to a parking space in a parking lot prior to assembly thereof.

17. The method of claim 13, further comprising filling said base with ballast after having engaged said signpost at said first location and before having engaged said signpost to said base at said second location.

18. The apparatus of claim 1 wherein said base engages said signpost at two locations along said signpost, thereby ensuring that said signpost is held vertically.

19. The apparatus of claim 17, wherein said second posthole is sized and shaped to receive said signpost to permit said signpost to exit said base.

* * * * *